United States Patent [19]

Lamming et al.

[11] Patent Number: 5,321,396
[45] Date of Patent: Jun. 14, 1994

[54] INDEXING OF AUDIO/VIDEO DATA

[75] Inventors: Michael G. Lamming; William M. Newman, both of Cambridge, Great Britain

[73] Assignee: Xerox Corporation, Stamford, Conn.

[21] Appl. No.: 652,159

[22] Filed: Feb. 7, 1991

[51] Int. Cl.$^5$ .............................................. H04Q 1/00
[52] U.S. Cl. .................. 340/825.49; 340/825.34; 340/825.36; 364/225.5; 352/85; 352/89; 348/143
[58] Field of Search .................. 358/102, 108; 352/85, 352/89; 364/225.4, 225.5; 340/825.49, 825.36, 825.31, 825.34, 825.35, 707

[56] References Cited

U.S. PATENT DOCUMENTS

| | | | |
|---|---|---|---|
| 3,585,597 | 6/1971 | Holmerud | 364/225.5 |
| 4,400,777 | 8/1983 | Mori | 364/225.5 |
| 4,475,239 | 10/1984 | van Raamsdonk | 340/707 |
| 4,649,385 | 3/1987 | Aires et al. | 340/825.49 |
| 4,670,739 | 6/1987 | Kelly, Jr. | 340/825.49 |
| 4,774,570 | 9/1988 | Araki | 358/108 |
| 4,924,219 | 5/1990 | Sato | 340/825.49 |
| 4,992,866 | 2/1991 | Morgan | 340/825.49 |
| 5,012,049 | 4/1991 | Schier | 340/707 |

FOREIGN PATENT DOCUMENTS 2186409  8/1987  United Kingdom ........... 340/825.34

*Primary Examiner*—Donald J. Yusko
*Assistant Examiner*—Brian Zimmerman

[57] ABSTRACT

This invention relates to a system for monitoring the movements of people in an office or other environment. Each room to be monitored has within it a sensor responsive to signals transmitted by identifiers worn by the people whose movements are being tracked. The identifier signals give the identity of the person allocated that identifier. The sensors are themselves polled periodically by a computer to generate time-stamped records of who was within range of which sensor. When an event is to be recalled, other time-stamped audio or video records of what was said or done in each monitored room are scanned for that record which was being generated at the time of the event in question.

4 Claims, 1 Drawing Sheet

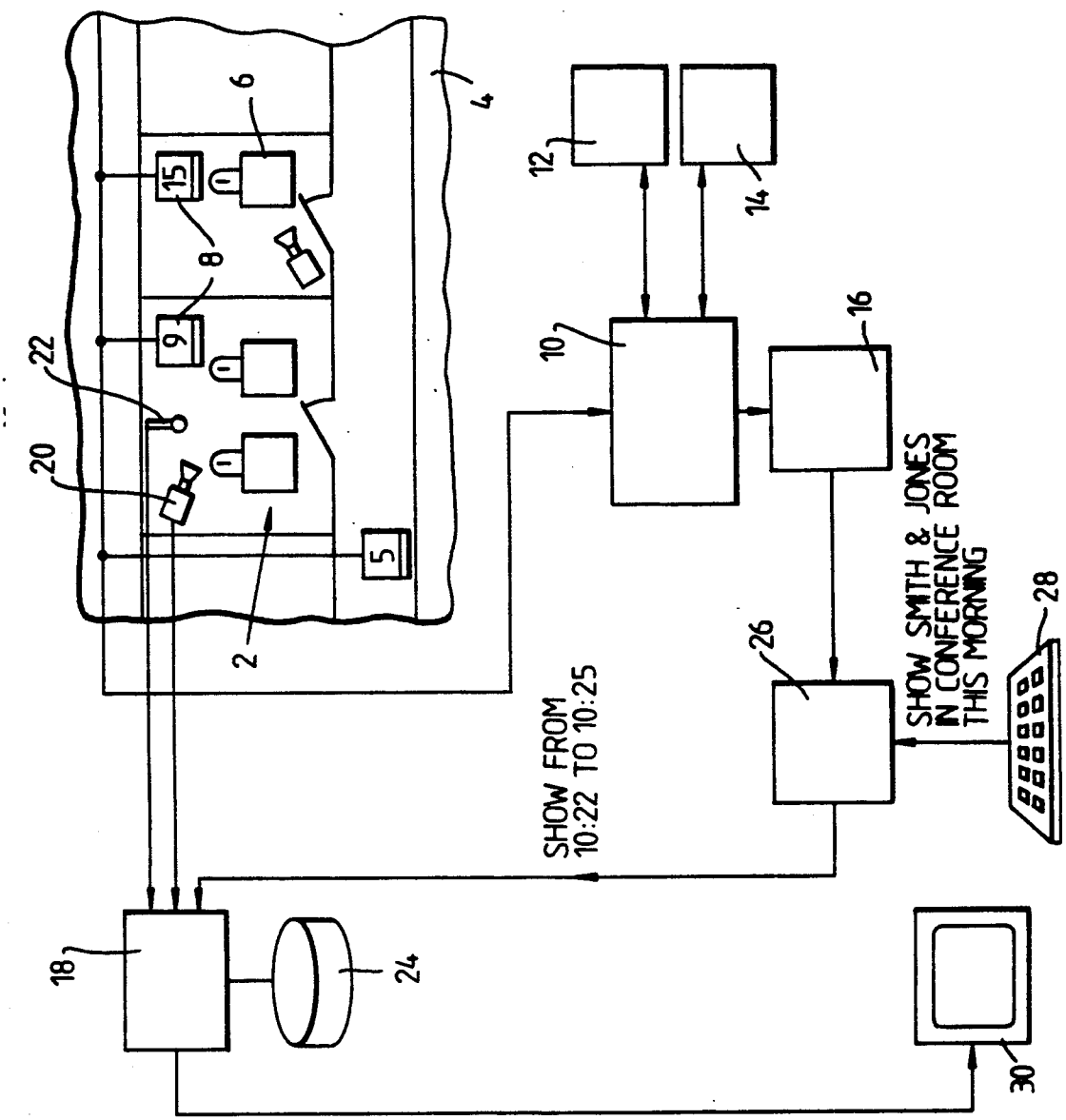

INDEXING OF AUDIO/VIDEO DATA

This invention relates to the activity-based indexing of recorded audio and/or video streams, in order to facilitate the fast retrieval at a later date of recordings of interest. The invention is based on there being a set of activity data defining people's changes of location in a monitored environment. The retrieval process involves using the activity data to provide index points into the recorded streams.

The invention focuses upon improving access to information that humans find particularly difficult to retrieve. It exploits a suggested autobiographical model of human memory which observes that humans seem to organise their memory in episodes. Associated with each episode are the properties: Where? When? With whom? and, In pursuit of what goal? an episode occurred. Humans seem able to recall these key properties of an episode long after the details of the episode itself have been forgotten. The present invention is concerned with building a system that enables retrieval and playback of recordings of episodes that would otherwise be difficult or impossible to retrieve, including matters for which records are not normally kept.

The present invention relies on location-sensing technology for monitoring, recording and time-stamping the movements of people. Later the resulting records can be used to identify the time of an event of interest. This ascertained time is used to locate a corresponding video or audio recording of the event.

In this way the invention offers the user the means to arrive quickly at the time at which a past event took place, in order to be able to use that time information to obtain access more efficiently and quickly to an audio or video recording. This speed of access is one of the essential requirements in making the technique of practical value. It avoids the need for the user to scan (aurally and/or visually) large amounts of audio or video material.

Accordingly the present invention provides a data retrieval system as claimed in the appended claims.

The present invention will now be described by way of example with reference to the accompanying drawings, in which:

FIG. 1 is a diagrammatic view of one system of the present invention, and

FIG. 2 shows part of a list of time-stamped arrival/departure data.

The system shown in FIG. 1 is based on the use of identifiers 2 each intended to be carried by people in the environment 4 being monitored, each identifier being assigned a unique identification code which allows its location to be determined. One particularly convenient form of identifier is the 'Active badge' pioneered by Olivetti. This identifier, or badge, takes the form of miniaturised circuitry in a housing 6 able to be pinned or clipped to the clothing of the person issued with the identifier. The circuitry is designed to transmit a badge identification code by emitting a pulse width modulated infra-red coded signals for a tenth of a second every 12 to 15 seconds. The signals, by their nature, have a range of about six metres, and will not travel through walls, which makes them very useful for keeping track of people moving between rooms constituting the environment being monitored. In each of the rooms or corridors of interest (which would normally exclude toilets, lifts and like utility spaces), hereafter called 'zones', would be positioned one or more sensors 8 responsive to the infra-red output signals.

There is at least one sensor 8 in each zone of the building or other environment being monitored, each sensor having a unique sensor identification code and being capable of collecting badge identification codes transmitted by badges within range. In large zones, the effective range of the badges might necessitate there being several sensors uniformly distributed over the zone, as by being mounted from the ceiling, to ensure that no person in the room and carrying a badge is not in range of at least one sensor, so that the room has no 'blind spots'. The sensors are connected to a zone activity analyser 10 which interrogates the sensors at chosen intervals, and from them receives badge identification codes indicating the badges within range of each sensor since the previous interrogation. The zone activity analyser has access to a table 12 from which the name of the owner of a badge can be determined from a badge identification code. The zone activity analyser also has access to a table 14 for determining the name of a zone from the sensor identification code of a sensor in that zone. The zone activity analyser looks up the badge identification codes in the badge-to-owner table; looks up the sensor identification codes in the sensor-to-zone table; time-stamps the resulting data, and adds them to a list of time-stamped arrival/departure records 16.

An example of part of a list of time-stamped arrival/departure records is shown in FIG. 2.

Contemporaneously, a time-coded recording 24 is produced by a computer-controllable record-playback unit 18, hereafter called 'the recorder', connected to video camera 20 and/or microphone 22 monitoring one of the zones in the environment. There may be several recorders each monitoring the same or different zones via separate cameras and/or microphones.

When a user wishes to play back a section of the recorded material, he or she puts a search pattern into the retrieval unit 26 by means of a terminal 28. The search pattern incorporates remembered parameters of the event sought to be replayed. These parameters may well include the time and data at which the event took place; names of the people involved, and/or the name of the respective zone. The retrieval unit scans the list 16 searching for records of each event which matches the search pattern. Any matching record is retrieved. If several records match the search pattern, then they may be presented (by means not shown) to the user on the terminal 28 for him or her to select the one of interest. When one event record has been retrieved or selected, the retrieval unit 26 extracts the time-stamp and zone information, and constructs a playback request to the appropriate recorder 18 for the zone at which the events took place. This playback request specifies a start and/or stop timecode.

On receipt of the playback command, the respective recorder 18 searches the audio and/or video record for the specified timecode, and performs the specified start and/or stop operation, displaying the video on a monitor 30.

Although the different embodiments of the invention are implemented in the form of computer code, which is not included in this specification, it is nevertheless believed that the above description and drawings are sufficient to enable a man skilled in the art of designing software systems to put this invention into practice.

We claim:

1. A system for providing for fast random access to a contiguous sequence of time-stamped data records of events in a specific physical environment, comprising:
   a plurality of sensors, each monitoring a respective zone forming part of the physical environment, to detect the presence within respective ones of said zones of a person carrying a personal identifier in the form of a transmitter of signals to which said sensors are sensitive;
   means for interrogating said sensors at time intervals to construct sensor activity records specifying which identifiers were detected by each sensor during each of said intervals;
   means for processing the sensor activity records to produce time-stamped arrival/departure records specifying the period for which each person carrying an identifier is in a particular zone;
   means for producing at least audio and/or video time-stamped records of events taking place in each of the zones;
   means for specifying a search pattern incorporating parameters of a remembered event sought to be recalled or replayed, which parameters may include the time and/or date of the event, people involved, and/or location;
   means for scanning through the said list at high speed using the search pattern to arrive at each matching record of an event in which a specified person was, or a specified combination of people were present concurrently, in a specified zone;
   means for selecting one matching record and extracting from it the time-stamp information;
   means for issuing a command to play back to the user the audio and/or video recording corresponding to this time-stamp information, and
   means for presenting played back information to the user.

2. A system as claimed in claim 1, in which the environment is divided into several zones of which each zone has within it at least one sensor.

3. A system as claimed in claim 1, in which each identifier is in the form of an active badge adapted to transmit at intervals a signal to which the sensors are sensitive giving the identity of the person allocated the badge.

4. A system as claimed in claim 1, in which each identifier is adapted to transmit signals in the infra-red part of the spectrum, and in which each sensor is adapted to detect infra-red signals.

* * * * *